United States Patent
Kim

(10) Patent No.: US 6,848,431 B2
(45) Date of Patent: Feb. 1, 2005

(54) FUEL FEEDING SYSTEM FOR A LIQUEFIED PETROLEUM INJECTION ENGINE

(75) Inventor: In-Tag Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/738,289

(22) Filed: Dec. 16, 2003

(65) Prior Publication Data

US 2004/0129256 A1 Jul. 8, 2004

(30) Foreign Application Priority Data

Dec. 18, 2002 (KR) ................................ 10-2002-0081205

(51) Int. Cl.[7] .............................................. F02M 69/54
(52) U.S. Cl. ...................................... 123/514; 123/506
(58) Field of Search ................................ 123/457–459, 123/467, 506, 514

(56) References Cited

U.S. PATENT DOCUMENTS

| 4,327,684 | A |   | 5/1982  | Sami et al. ................. 123/387 |
| 4,398,519 | A |   | 8/1983  | Tissot et al. ................ 123/446 |
| 5,201,295 | A |   | 4/1993  | Kimberley et al. .......... 123/467 |
| 5,263,456 | A | * | 11/1993 | Owen-Evans ................ 123/495 |
| 5,379,740 | A |   | 1/1995  | Moore et al. ................ 123/478 |
| 5,413,077 | A |   | 5/1995  | Hornby et al. ............... 123/457 |
| 5,515,280 | A |   | 5/1996  | Suzuki .................... 364/431.05 |
| 5,697,341 | A |   | 12/1997 | Ausman et al. ............. 123/446 |
| 5,967,119 | A | * | 10/1999 | Burkhard et al. ........... 123/458 |
| 5,974,865 | A | * | 11/1999 | Dambach ..................... 73/49.7 |
| 6,244,241 | B1 | * | 6/2001 | Mamiya et al. ............. 123/295 |
| 6,622,701 | B2 | * | 9/2003 | Endo .......................... 123/467 |

FOREIGN PATENT DOCUMENTS

WO   WO 92/01150   1/1992

* cited by examiner

*Primary Examiner*—Weilun Lo
(74) *Attorney, Agent, or Firm*—Morgan Lewis & Bockius LLP

(57) ABSTRACT

A fuel feeding system for an LPI engine is made to allow fuel remaining inside a fuel supply line and a fuel return line to be drained into a bombe by bypassing a pressure regulator while an engine gets cooler after operation, whereby the fuel can be saved from external leakage via a fuel injector, and contaminants are reduced while the engine is running, resulting in improved maintenance of the engine during an engine overhaul.

3 Claims, 2 Drawing Sheets

FUEL FEEDING SYSTEM FOR A LIQUEFIED PETROLEUM INJECTION ENGINE

CROSS-REFERENCE TO RELATED APPLICATIONS

This application claims priority of Korean Application No. 10-2002-0081205, filed on Dec. 18, 2002, the disclosure of which is incorporated fully herein by reference.

FIELD OF THE INVENTION

The present invention relates to a fuel feeding system for a Liquefied Petroleum Injection (LPI) engine and, more particularly, to a fuel feeding system whereby Liquefied Petroleum (LP) in a fuel supply line can be prevented from leaking through an injector while the engine adjusts to atmospheric temperature after the vehicle stops moving.

BACKGROUND OF THE INVENTION

In a conventional fuel feeding system for an LPI engine, a bombe is mounted with a fuel pump for pumping LP. Fuel pumped by the fuel pump is transmitted via a multi-valve to a fuel supply line and is injected through an injector to a combustion chamber and the fuel remains therein are made to return through a fuel return line to the bombe.

The fuel supply line includes a supply stopping valve for stopping the fuel supply when the engine ceases running, a temperature sensor for measuring fuel temperature, and a service valve for maintaining the fuel in a liquid state by collecting the gas generated from the fuel and the fuel return line comprises a pressure sensor for measuring the fuel pressure and a pressure regulator for keeping the fuel pressure at a preset level.

However, there is a drawback in the fuel feeding system for an LPI engine thus described. The supply stopping valve prevents the fuel from being supplied from the bombe into the fuel supply line when the engine stops running. Some of the fuel leftover in a section between the supply stopping valve installation portion of the fuel supply line and the pressure regulator installation portion of the fuel return line by the pressure regulator leaks into the combustion chamber via the injector due to pressure increase while the engine gradually cools down to a normal temperature.

The fuel leakage to the combustion chamber either leaks out again or generates a problem of discharging an excessive pollutant material when an engine is initially started.

SUMMARY OF THE INVENTION

Embodiments of the present invention provide a fuel feeding system for an LPI engine configured to prevent the fuel from escaping outwardly via a fuel injector and to reduce contaminants generated while an engine starts to run, by discharging the fuel remaining in the fuel supply line and the fuel return line to a bombe when the engine cools down as it stops its operation.

In accordance with a preferred embodiment of the present invention, a fuel feeding system for an LPI engine comprises a microtubule for bypassing a pressure regulator mounted at a fuel return line. The system preferably further comprises a bypass pipe for bypassing the pressure regulator mounted at the fuel return line and a bypass stopping valve installed at the bypass line.

DETAILED DESCRIPTION OF THE INVENTION

Hereinafter, the preferred embodiments of the present invention will be described in detail with reference to the accompanying drawings.

Figure 1:
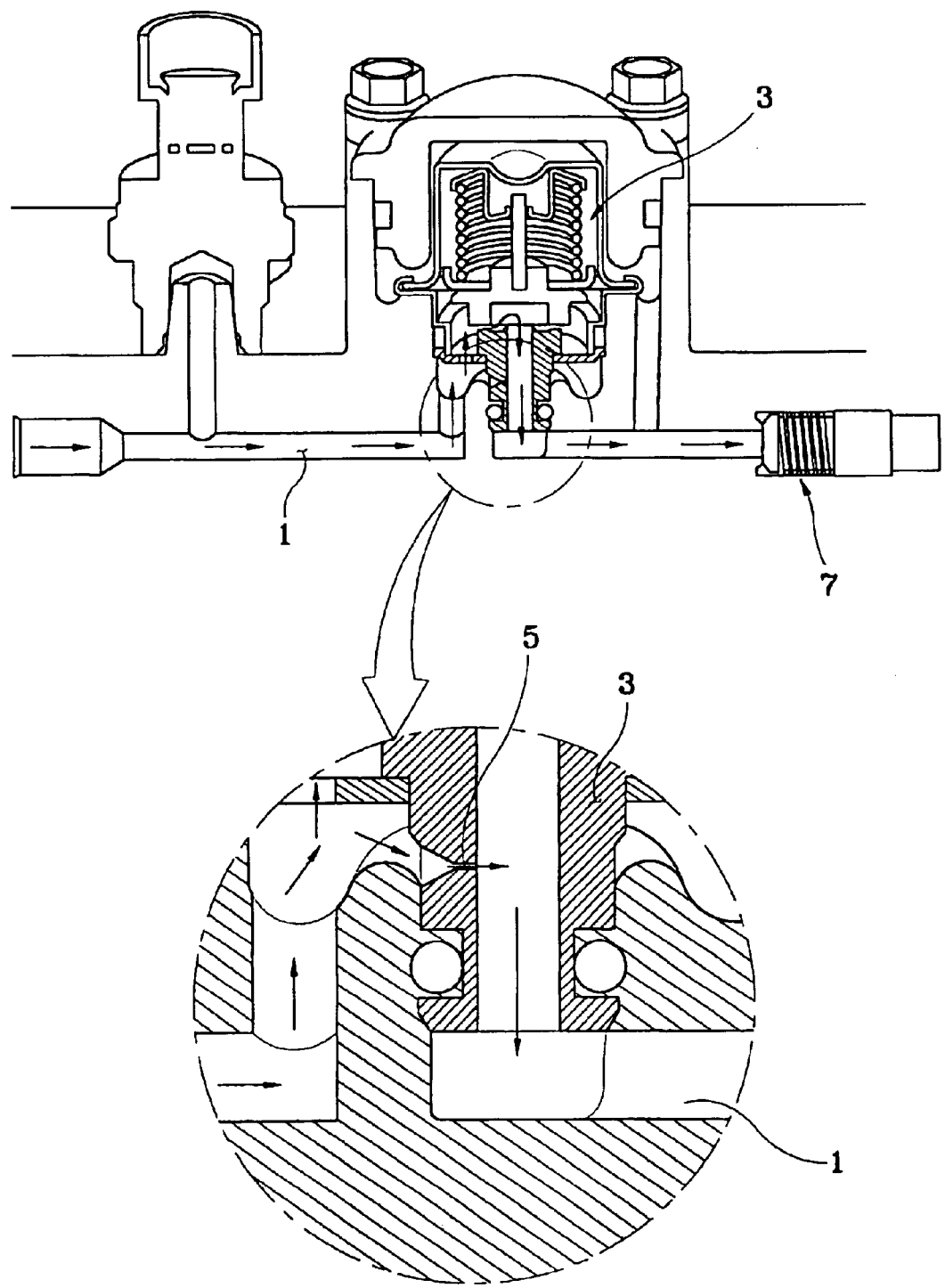
FIG. 1 is a sectional view of a pressure regulator part at a fuel feeding system for an LPI engine according to a first embodiment of the present invention.

FIG. 1 is a schematic view illustrating a first embodiment of a fuel feeding system for an LPI engine pursuant to the present invention, wherein a microtubule 5 is equipped for bypassing a pressure regulator 3 mounted at a fuel return line 1. In one embodiment, as shown in the drawing, the microtubule 5 has a diameter more than ten times smaller than that of the fuel return line 1 mounted with the pressure regulator 3. A check valve 7 is mounted downstream of the microtubule 5 in fuel return line 1.

With the microtubule 5 for bypassing the pressure regulator 3 thus constructed, the fuel flowing through the microtubule 5 does not affect the formation of pertinent fuel pressure to be supplied to a fuel injector while an engine is running, and the pressure regulator 3 appropriately adjusts the fuel pressure at the fuel return line 1. Nevertheless, when the engine stops, fuel between a supply stopping valve and the pressure regulator 3 is drained into a bombe by bypassing the pressure regulator 3 via the microtubule 5, thereby preventing the fuel from leaking through an injector.

Accordingly, the diameter of the microtubule 5 can be experimentally or analytically obtained in relation to a model of an applied engine because it should be tiny enough not to interfere on forming a proper fuel pressure while the engine is running, allowing the fuel to bypass at an appropriate speed when the engine stops. The check valve 7 is so designed as to prevent the fuel from backflowing via the microtubule 5 from the bombe.

Figure 2:
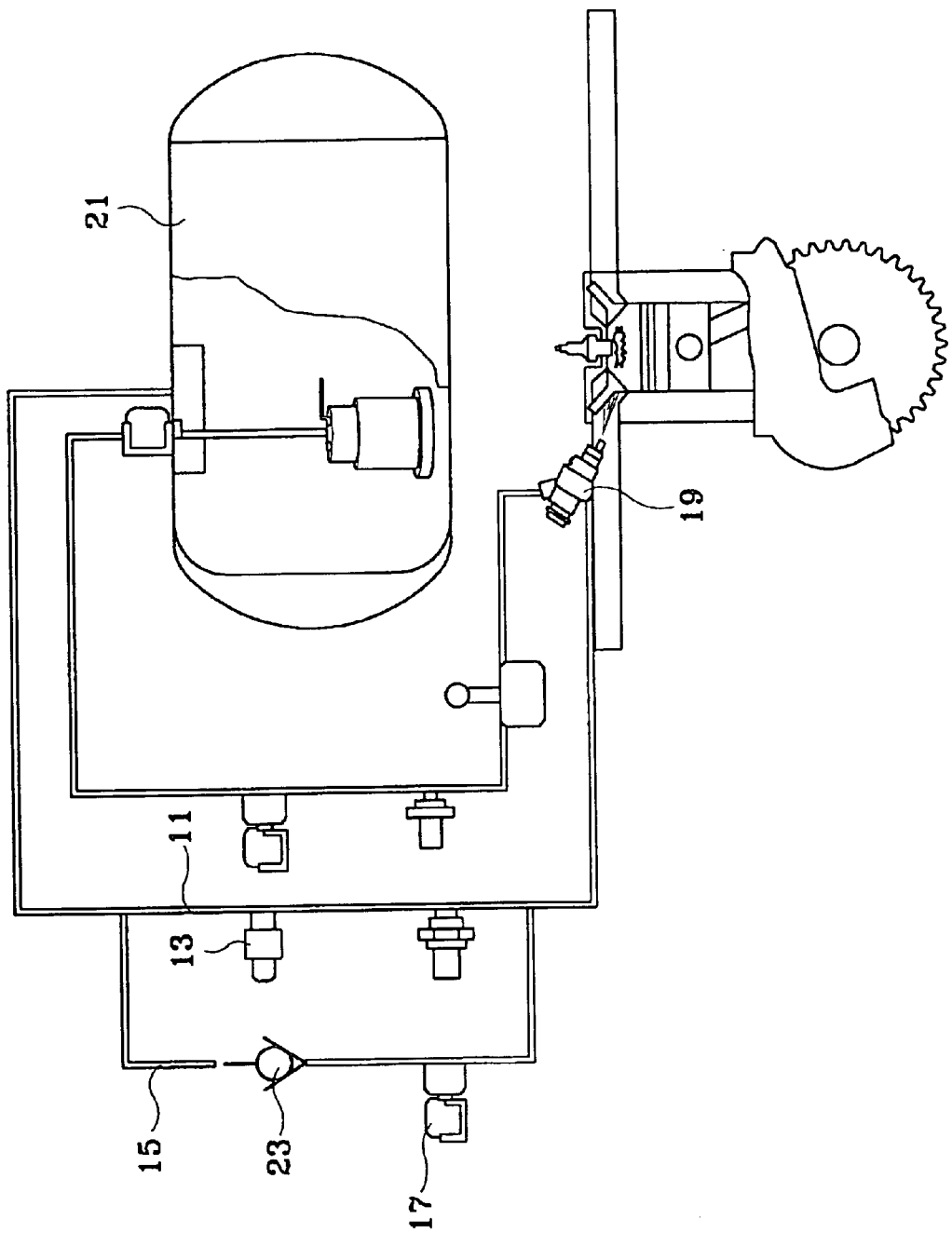
FIG. 2 is a fuel feeding system for an LPI engine according to a second embodiment of the present invention.

FIG. 2 illustrates an alternative embodiment of the present invention, wherein the fuel feeding system for an LPI engine comprises a bypass pipe 15 for bypassing a pressure regulator 13 mounted at a fuel return line 11 and a bypass stopping valve 17 equipped at the bypass pipe 15. In other words, a separate bypass pipe 15 is installed in place of a microtubule 5 since the microtubule 5 cannot carry out opening/closing operations where the bypass pipe 15 is restricted by the bypass stopping valve 17.

Of course, the bypass stopping valve 17 is made to block the bypass pipe 15 by a separate controller (not shown) while an engine is running, so as to refrain the pressure regulator 13 from being negatively affected on forming the fuel pressure. However, when the engine stalls the bypass stopping valve 17 opens the bypass pipe 15 to keep the fuel from leaking into an injector 19 by draining the fuel around the injector 19 out into the bombe.

In addition, the downstream part of the bypass stopping valve 17 of the bypass pipe 15 is equipped with a check valve 23 for preventing reverse-flow of the fuel from a bombe 21.

As apparent from the foregoing, there is an advantage in the fuel feeding system for an LPI engine in that the fuel leftover in a fuel supply line and a fuel return line is made to bypass a pressure regulator to be discharged to a bombe when an engine is stopped to be cooled, thereby avoiding external leakage of fuel via a fuel injector and contributing to the reduction of contaminants. There is another advantage in that external leakage of fuel can be drastically reduced, resulting in improved maintenance of the engine during an engine overhaul.

What is claimed is:

1. A fuel feeding system for a liquefied petroleum injection engine, the system comprising:
    a pressure regulator mounted in a fuel return line; and
    a microtubule positioned within said pressure regulator for bypassing a function of the pressure regulator.

2. The system as defined in claim 1, wherein said microtubule has a diameter more than ten times smaller than that of said fuel return line mounted with said pressure regulator.

3. The system as defined in claim 1, wherein the downstream part of said microtubule of said fuel return line is equipped with a check valve.

* * * * *